No. 768,120. PATENTED AUG. 23, 1904.
N. FISHER.
BADGE OR BUTTON.
APPLICATION FILED APR. 1, 1904.
NO MODEL.

Witnesses:
Jas E. Hutchinson

Inventor:
Nathan Fisher,
By his Attorneys

No. 768,120. Patented August 23, 1904.

UNITED STATES PATENT OFFICE.

NATHAN FISHER, OF DECATUR, ILLINOIS, ASSIGNOR OF TWO-THIRDS TO GEO. W. MEYERS AND E. S. McCLELLAND, OF DECATUR, ILLINOIS.

BADGE OR BUTTON.

SPECIFICATION forming part of Letters Patent No. 768,120, dated August 23, 1904.

Application filed April 1, 1904. Serial No. 201,126. (No model.)

*To all whom it may concern:*

Be it known that I, NATHAN FISHER, a citizen of the United States, residing at Decatur, in the county of Macon and State of Illinois, have invented certain new and useful Improvements in Badges or Buttons, of which the following is a specification, reference being had therein to the accompanying drawings.

This invention relates to a novel improvement in buttons or badges, and has for its object the provision of a simple device of this character having normal concealed portions with improved means permitting automatic opening of the device and for locking the same closed.

A convenient embodiment of the invention comprises a disk or face-plate and a leaf or leaves pivoted upon the back thereof, a spring connected to the plate at a point at one side of its pivot designed to automatically throw the leaf outwardly beyond the edge of the face-plate to expose the same to view, and a lock arranged to engage the leaf at a point beyond the opposite side of the pivot to fasten the plate in closed position.

The novel details in the construction and arrangement of the several parts of the device will be apparent from the detailed description hereinafter.

Figure 1:
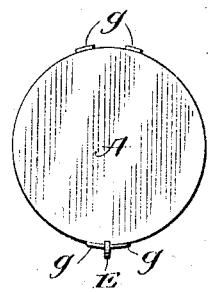
Figure 2:
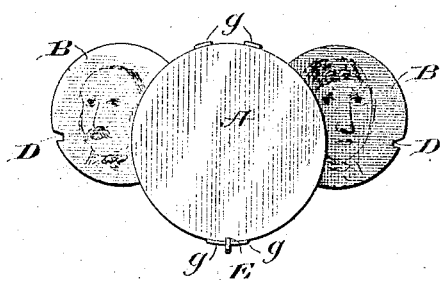
Figure 3:
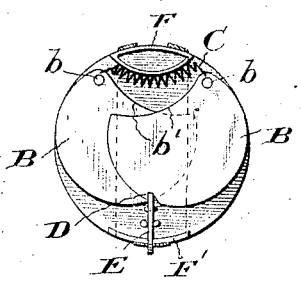
Figure 4:
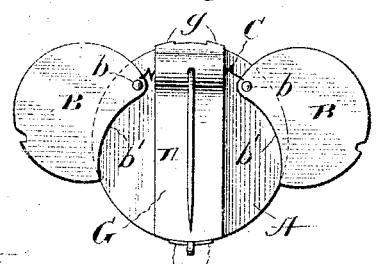
Figure 5:
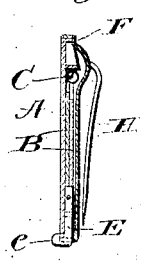

In the drawings, Figure 1 is an elevation of the device closed. Fig. 2 is a similar view of the device open. Fig. 3 is a rear view of the device closed, parts being broken away. Fig. 4 is a view similar to Fig. 3, the leaves being shown in open position; and Fig. 5 is a vertical cross-sectional view of Fig. 1.

Referring more specifically to the drawings, A designates a face-plate, which may be of any desired formation, the same being conveniently shown as circular in contour, and on the front of this plate any artistic or other matter may be applied, as may be found expedient.

At separate points and near the periphery of the plate A disks or leaves B are pivoted at $b$ on the back thereof, said leaves being cut out, as at $b'$, to accommodate a coiled spring C, connected at its respective ends to one of the leaves at a point above the pivot of said leaf. The leaves are loose upon their pivots, whereby they may overlie each other, as clearly shown in Fig. 5.

In the peripheries of the leaves are formed shoulders D, arranged to be engaged by a stop-pin E, having an offset projection $e$ for engagement by a finger of the user to release the same. The shoulders just referred to are disposed at a point beyond the side of the pivot of the leaf opposite to that adjoining the spring, whereby the tension of the spring will exercise sufficient friction between the shoulders and the locking-pin to retain the same in normal closed position. Flanges F F' project outwardly from the rear face of the plate A and constitute spacing members for a back-plate G, secured by lugs $g$ to the face-plate and overlying the spring C and stop-pin E to properly house the same. On the back-plate a pin H is provided for attaching the device to the garment or the like.

The leaves are to be provided with photographs or other decorative matter.

Slight changes may be made in the construction herein disclosed without departing from the invention.

Having thus described the invention, what is claimed as new, and desired to be secured by Letters Patent, is—

1. In a device of the character described, a face-plate, leaves pivoted thereto, and a free horizontally-disposed coiled spring and lock respectively arranged at opposite sides of the pivot of each leaf said spring being interposed between the leaves and connected at its ends only and thereto, substantially as and for the purpose described.

2. In a device of the charater described, a face-plate, a leaf pivoted thereto, and a spring and lock respectively arranged at opposite sides of the pivot of said leaf, in combination with a back-plate overlying and housing the spring and lock, substantially as and for the purpose described.

3. In a device of the character described, a face-plate, a leaf pivoted thereto, and a spring and lock respectively arranged at opposite sides of the pivot of said leaf, in combination with a back-plate overlying and housing the spring and lock and spacing devices for said back-plate, substantially as and for the purpose described.

In testimony whereof I affix my signature in presence of two witnesses.

NATHAN FISHER.

Witnesses:
F. R. GOODE,
E. S. PARKS.